(12) United States Patent
Mizuno

(10) Patent No.: US 12,730,622 B2
(45) Date of Patent: Sep. 8, 2026

(54) RELAY DEVICE AND NON-TRANSITORY COMPUTER-READABLE STORAGE MEDIUM

(71) Applicant: BROTHER KOGYO KABUSHIKI KAISHA, Nagoya (JP)

(72) Inventor: Akiko Mizuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 151 days.

(21) Appl. No.: 18/494,680

(22) Filed: Oct. 25, 2023

(65) Prior Publication Data

US 2024/0143312 A1 May 2, 2024

(30) Foreign Application Priority Data

Oct. 28, 2022 (JP) ................................ 2022-173163

(51) Int. Cl.
*G06F 8/65* (2018.01)

(52) U.S. Cl.
CPC .................................... *G06F 8/65* (2013.01)

(58) Field of Classification Search
CPC .................................................. G06F 8/65–75
See application file for complete search history.

(56) References Cited

U.S. PATENT DOCUMENTS

2019/0332332 A1 10/2019 Yoshida et al.
2021/0157570 A1* 5/2021 Harata .................... B60R 16/02
2022/0129216 A1 4/2022 Kunimoto

FOREIGN PATENT DOCUMENTS

JP 2019185802 A 10/2019
JP 2019191948 A 10/2019
JP 2022-70493 A 5/2022
WO WO-2018154949 A1 * 8/2018 ............... G06F 8/65
WO 2019187535 A1 10/2019

OTHER PUBLICATIONS

Ushida, WO2018154949A1 (Translated) "Program updating system, control device, program updating method and computer program", pp. 86, 2018 (Year: 2018).*

* cited by examiner

*Primary Examiner* — Duy Khuong T Nguyen
(74) *Attorney, Agent, or Firm* — KENEALY VAIDYA LLP

(57) ABSTRACT

A non-transitory computer readable storage medium storing a relay program includes first and second acquisition units, an instruction unit, and a determination unit. The first acquisition unit is configured to acquire a version of a control program of a terminal device after update. The instruction unit is configured to instruct update of the control program in the terminal device. The second acquisition unit is configured to acquire a version of the control program installed in the terminal device that is restarted. The determination unit is configured to determine whether the control program is updated in the terminal device based on the version acquired by the first acquisition unit and the version acquired by the second acquisition unit.

4 Claims, 3 Drawing Sheets

FIG. 1

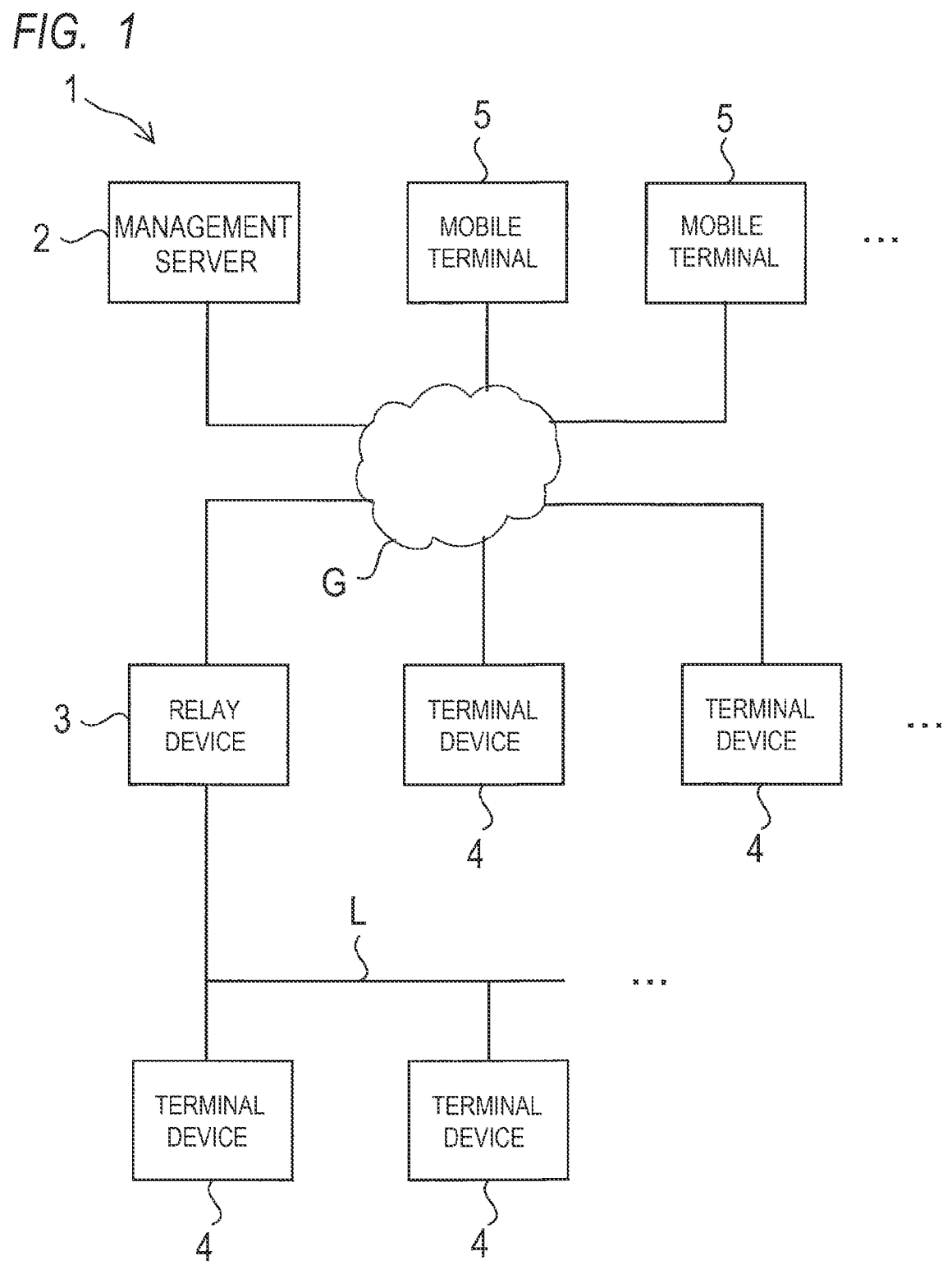

1
2 MANAGEMENT SERVER
5 MOBILE TERMINAL
5 MOBILE TERMINAL
...
G
3 RELAY DEVICE
TERMINAL DEVICE 4
TERMINAL DEVICE 4
...
L
...
TERMINAL DEVICE 4
TERMINAL DEVICE 4

RELAY DEVICE AND NON-TRANSITORY COMPUTER-READABLE STORAGE MEDIUM

REFERENCE TO RELATED APPLICATIONS

This application claims priority from Japanese Patent Application No. 2022-173163 filed on Oct. 28, 2022. The entire content of the priority application is incorporated herein by reference.

BACKGROUND ART

There is known a technique of managing a terminal device having a function as an image forming apparatus such as a printer or a scanner by a so-called Mobile Device Management system (an MDM system) that centrally manages terminal devices such as smartphones. In the MDM system of a related art, a server that manages the smartphones or the like communicates with the terminal device serving as an image forming apparatus via a relay device, and manages the terminal device.

DESCRIPTION

In the MDM system, the terminal device may update a control program (in other words, firmware) for controlling the terminal device in response to an instruction from the server. However, it is necessary to restart the terminal device in order to update the control program, but it is difficult for the terminal device in which the control program is updated to still continue to hold information on a version of the control program before update after the terminal device is restarted. Therefore, in the terminal device, it is difficult to accurately grasp success of the update of the control program in the terminal device, and it is also difficult to accurately grasp the success of the update in the server which instructs the update of the control program.

An object of the present disclosure is to make it possible to grasp whether a control program is successfully updated.

In one aspect of the present disclosure is a non-transitory computer readable storage medium storing a relay program causing a computer to operate as a relay device configured to relay communication between a server and a terminal device, and the relay program includes a reception unit, a first acquisition unit, an instruction unit, a second acquisition unit, and a determination unit. The reception unit is configured to receive, from the server, an update instruction instructing update of a control program for controlling the terminal device. The first acquisition unit is configured to acquire a version of the control program after update according to the update instruction. The instruction unit is configured to instruct update of the control program in the terminal device. The second acquisition unit is configured to acquire a version of the control program installed in the terminal device that is restarted. The determination unit is configured to determine whether the control program is updated in the terminal device based on the version of the control program acquired by the first acquisition unit and the version of the control program acquired by the second acquisition unit, and output a determination result to an outside.

In one aspect of the present disclosure, the terminal device may be configured to provide, to the relay device, status information indicating a state of the terminal device. The status information may include at least information indicating an initial notification after startup of the terminal device and information indicating the version of the control program installed in the terminal device. The second acquisition unit may be configured to acquire the version of the control program from the acquired status information when the status information including the information indicating the initial notification after startup of the terminal device is acquired after the instruction unit instructs the terminal device to update the control program.

FIG. 1 is a block diagram illustrating a configuration of a terminal management system.

Figure 2:
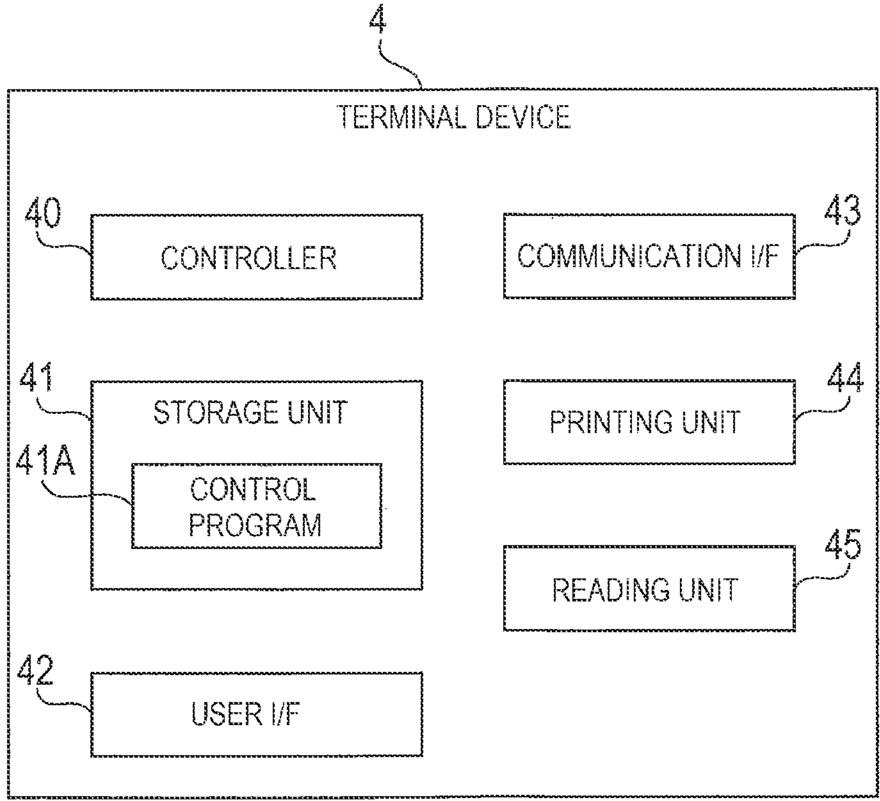
FIG. 2 is a block diagram illustrating a configuration of a terminal device.

Hereinafter, an embodiment of the present disclosure will be described with reference to the drawings. The embodiment of the present disclosure is not limited to the following embodiment, and various forms can be adopted as long as they belong to the technical scope of the present disclosure.

1. Overview

A terminal management system 1 of the present embodiment includes a management server 2, a relay device 3, a plurality of terminal devices 4, and a plurality of mobile terminals 5 (see FIG. 1).

The management server 2 and the relay device 3 are connected to a global network G and can communicate with each other via the global network G. The management server 2 and the relay device 3 can communicate with each other by, for example, Hypertext Transfer Protocol Secure (HTTPS). Further, the global network G may be any network, and may be the Internet as an example.

The terminal management system 1 has a function as a so-called mobile device/terminal management system (in other words, an MDM system). The management server 2 can manage the mobile terminals 5 by communicating with the mobile terminals 5, which are management targets, via the global network G. As an example, the management server 2 is held by a service provider of the MDM system, and the relay device 3 is held by an administrator who manages each of the terminal devices 4 using the MDM system.

2. Terminal Device

The terminal device 4 has a function as an image forming apparatus, and has at least one of a printer function of printing an image based on image data and a scanning function of reading an image on a sheet and generating image data. The terminal device 4 may be configured as a portable small device, or may be configured as a stationary device.

As an example, the terminal device 4 is connected to the global network G and can communicate with the relay device 3 via the global network G. As an example, the terminal device 4 may be connected to a local network L together with the relay device 3, and may communicate with the relay device 3 via the local network L. The local network L may be a so-called intranet, may be a wired network, may be a wireless network such as a wireless LAN, or may be a network including both wired and wireless networks. Alternatively, the terminal device 4 may communicate with the relay device 3 via a wired or wireless communication line such as USB or Bluetooth (registered trademarks).

The terminal device 4 can communicate with the relay device 3 by HTTPS, for example. Further, although details will be described later, the terminal device 4 is configured to communicate with the management server 2 via the relay device 3, and as an example, the terminal device 4 may be configured to be unable to communicate with the management server 2 without going through the relay device 3.

The terminal device 4 includes a controller 40, a storage unit 41, a user interface (UF) 42, and a communication interface (UF) 43 (see FIG. 2). Further, the terminal device 4 includes, for example, a printing unit 44 and a reading unit 45.

The controller 40 includes at least one CPU. The storage unit 41 includes at least one semiconductor memory such as a ROM, a RAM, an NVRAM, a flash memory, or an SSD. That is, the terminal device 4 includes a computer including at least one CPU and at least one semiconductor memory.

The storage unit 41 stores a control program 41A (in other words, firmware) for centrally controlling the terminal devices 4, and the controller 40 operates according to the control program 41A to implement various functions of the terminal devices 4. The various functions implemented by the controller 40 are not limited to being implemented by executing the control program 41A, and a part or all of the functions may be implemented using one or a plurality of pieces of hardware.

The user I/F 42 includes an input device for receiving various inputs such as buttons and a touch panel. The user I/F 42 further includes a display device such as a liquid crystal panel or an LED display device.

The communication I/F 43 is a part for communicating with a device such as the relay device 3 via, for example, the global network G, the local network L, or a communication line such as the USB or the Bluetooth.

Further, the printing unit 44 is a unit for implementing the printer function described above, and the reading unit 45 is a unit for implementing the scanning function described above. Of course, the terminal device 4 may include one of the printing unit 44 and the reading unit 45.

3. Relay Device

Figure 3:
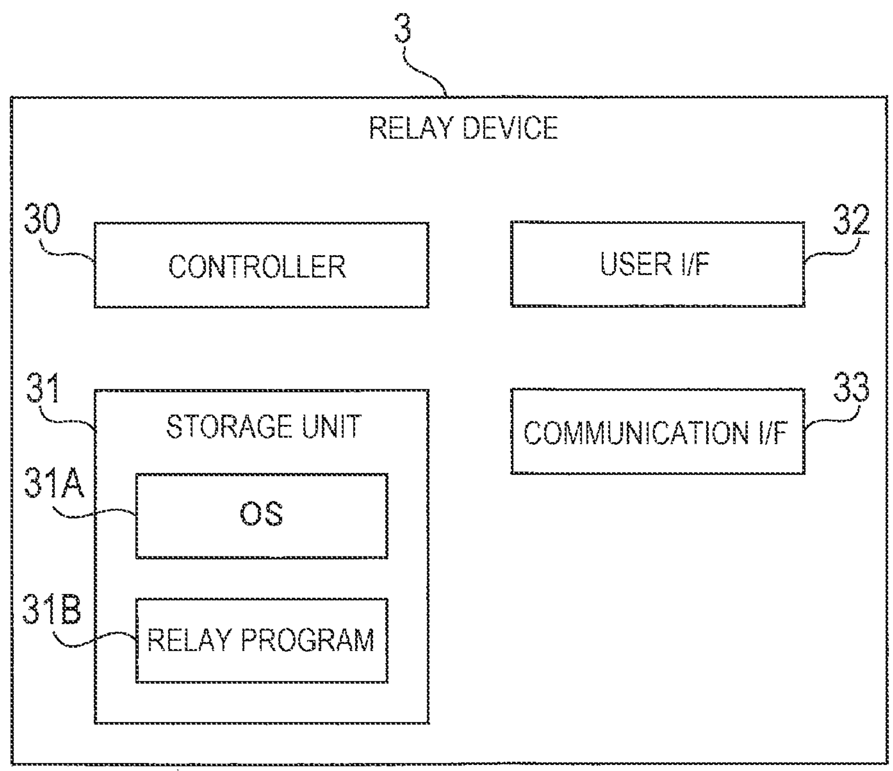
FIG. 3 is a block diagram illustrating a configuration of a relay device.

The relay device 3 is configured to relay communication between the management server 2 and the terminal device 4. That is, the terminal device 4 communicates with the management server 2 via the relay device 3. The relay device 3 includes a controller 30, a storage unit 31, a user I/F 32, and a communication I/F 33 (see FIG. 3).

The controller 30 includes at least one CPU. The storage unit 31 includes at least one semiconductor memory such as a ROM, a RAM, an NVRAM, a flash memory, or an SSD. Further, the storage unit 31 may include, for example, at least one hard disk drive. That is, the relay device 3 includes a computer including at least one CPU and at least one semiconductor memory.

Various programs including an OS 31A and a relay program 31B (details will be described later) are installed in the relay device 3. The storage unit 31 has a configuration as a non-transitory tangible recording medium, and stores programs such as the operating system (OS) 31A and the relay program 31B. The controller 30 executes programs such as the OS 31A and the relay program 31B stored in the storage unit 31, which is a non-transitory tangible recording medium, to implement various functions of the relay device 3. The various functions implemented by the controller 30 are not limited to being implemented by executing the programs, and a part or all of the functions may be implemented using one or a plurality of pieces of hardware.

The relay program 31B may be installed in the relay device 3 in advance, for example. Further, the relay program 31B is provided in a state of being stored in a storage medium such as a DVD-ROM or a USB memory, and may be installed in the relay device 3 by the relay device 3 reading the relay program 31B from the storage medium. Further, the relay program 31B may be installed in the relay device 3 by being downloaded via the global network G or the local network L, for example.

In addition, an action data base (DB), which is a database for registering actions to be described later, is formed in the storage unit 31.

The user I/F 32 includes an input device for receiving various inputs from an administrator, such as a keyboard and a mouse. The user OF 32 further includes a display device such as a liquid crystal panel or an LED display device.

The communication OF 33 communicates with the management server 2 via, for example, the global network G. Further, the communication OF 33 communicates with the terminal device 4 via, for example, the global network G, the local network L, or a communication line such as the USB or the Bluetooth.

4. Function of Terminal Management System

The administrator of the terminal device 4 manages the terminal device 4 by accessing a management site in the management server 2 using, for example, a Web browser. The management server 2 manages the terminal device 4 by communicating with the terminal device 4 via the relay device 3 in response to an instruction received from the administrator via the management site. The function of the relay device 3 for managing the terminal device 4 is implemented by the controller 30 executing the relay program 31B.

As an example, the terminal management system 1 has an action instruction function, a periodic monitoring function, and a self-check monitoring function. The action instruction function is a function of causing the terminal device 4 to execute an action. The action may be, for example, update of various setting values, update of the control program 41A, installation of a certificate, download of a file, transmission of status information, or the like.

The relay device 3 registers an action to be executed by the terminal device 4 in the action DB provided in the storage unit 31. Further, the terminal device 4 performs polling to the relay device 3 in order to determine whether there is an action to be executed by the terminal device 4. For example, the terminal device 4 transmits a polling command to the relay device 3 at a periodic timing (for example, at intervals of 5 seconds). When receiving the polling command from the terminal device 4, the relay device 3 determines whether an action to be executed by the terminal device 4 is registered in the action DB. Then, if the action is registered, the relay device 3 transmits, to the terminal device 4, a command indicating the action to be executed.

The periodic monitoring function is a function in which the relay device 3 periodically acquires status information indicating a status of the terminal device 4 from the terminal device 4. The status included in the status information may be, for example, various setting values related to the image forming function, a remaining amount of a battery 56, a remaining amount of a coloring agent, a remaining amount of sheet, a place where the terminal device 4 exists, a user name of the terminal device, or the like.

In addition, the status information includes a status indicating a version of the control program 41A of the terminal device 4, and a status (hereinafter referred to as a startup flag) indicating a notification of initial status information after startup of the terminal device 4. The terminal device 4 transmits the status information due to startup associated with power-on or restart accompanying the update of the control program 41A. Then, the startup flag of the status information is in an ON state. On the other hand, after the terminal device 4 is started up or restarted, the startup flag of the status information transmitted for a second time or later is in an OFF state.

The storage unit 31 of the relay device 3 is provided with a management data base (DB) that accumulates status information of each terminal device 4. When receiving the status information, the controller 30 of the relay device 3 updates the management DB based on the status information.

The self-check monitoring function is a function of, when the status is changed in the terminal device 4, transmitting the status information indicating a changed status from the terminal device 4 to the relay device 3. When receiving the status information, the controller 30 of the relay device 3 updates the management DB based on the status information.

Therefore, for example, the administrator can access the management DB of the relay device 3 via the management site and check the status of the terminal device 4. For example, the administrator can request an action for the terminal device 4 via the management site.

In addition, the administrator can also manage the terminal device 4 by directly accessing the relay device 3 without using the management server 2 in a similar manner as in the case of using the management server 2. For example, the administrator can manage the terminal device 4 by operating the user OF 34 of the relay device 3 or by accessing the management site in the relay device 3 using a Web browser.

5. Update of Control Program of Terminal Device

Figure 4:
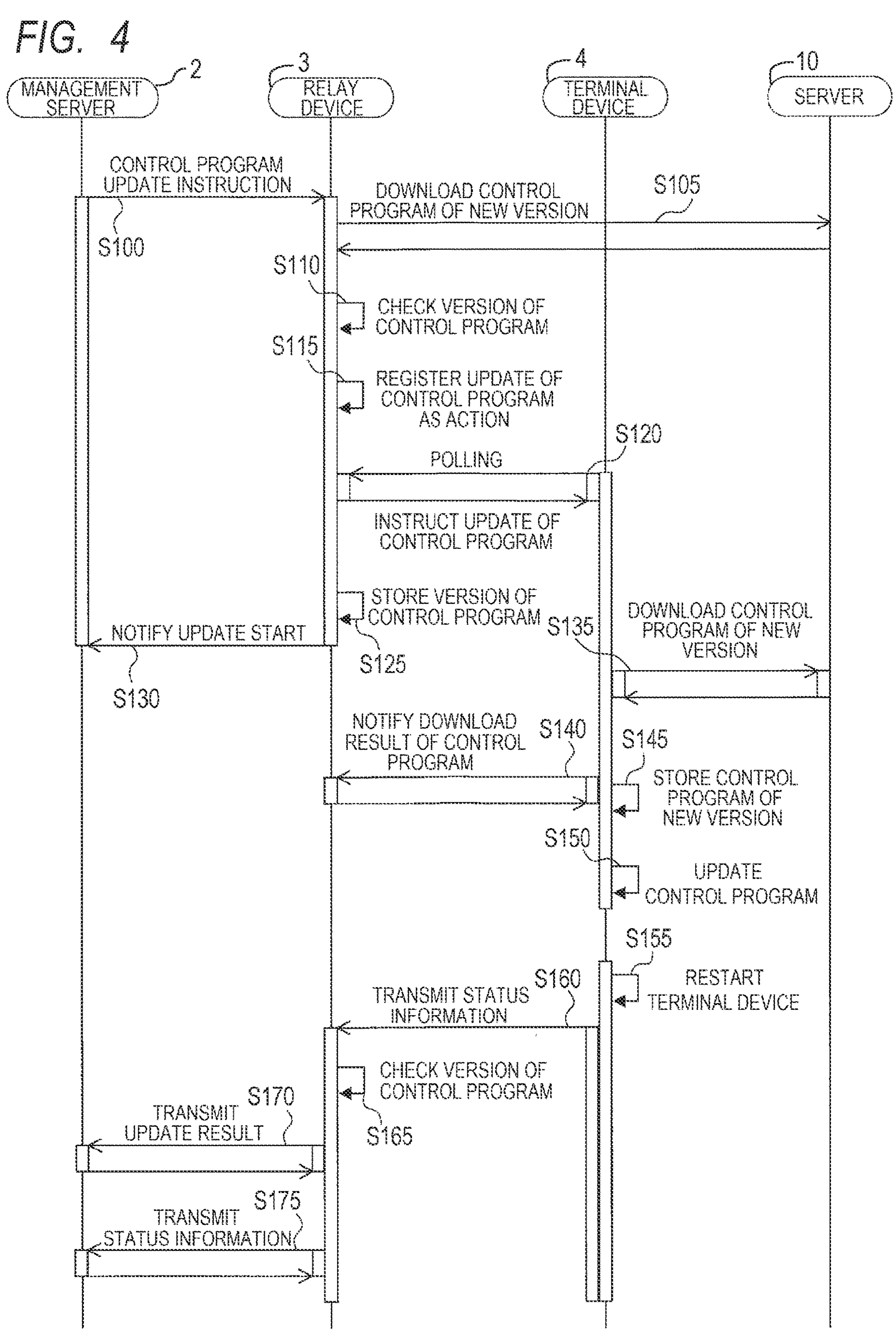
FIG. 4 is a flowchart of update processing of a control program of the terminal device.

Next, update processing of updating the control program 41A of the terminal device 4 using the control program of a new version (hereinafter, a new control program) provided from the server will be described with reference to the flowchart of FIG. 4. The processing is executed as one of the actions described above. The server that provides the new control program may be connected to the global network G or may be connected to the local network L to which the terminal device 4 is connected. Further, in the processing, the processing in the relay device 3 is implemented by the controller 30 operating according to the relay program 31B, and the processing in the terminal device 4 is implemented by the controller 40 operating according to the control program 41A.

In S100, the management server 2 transmits an update instruction for the control program 41A to the relay device 3 according to an instruction received from the administrator of the terminal device 4 via the management site. At this time, the management server 2 may transmit, to the relay device 3, identification information of the terminal device 4 in which the control program 41A is to be updated or server information (for example, a URL) for specifying a server 10 that provides the new control program.

In S105, the controller 30 of the relay device 3 that receives the update instruction for the control program 41A downloads the new control program from the server 10. In subsequent S110, the controller 30 analyzes the downloaded new control program, determines whether the new control program is firmware corresponding to the terminal device 4, and grasps a version of the new control program. Then, the controller 30 stores the version of the new control program into the storage unit 31 and discards the downloaded new control program. The controller 30 may acquire the version of the new control program from the server 10 instead of downloading the new control program from the server 10. In subsequent S115, the controller 30 registers, in the action DB, "update of the control program 41A" as the action of the terminal device 4 designated by the management server 2.

A case is assumed in which the relay device 3 cannot update the control program 41A of the terminal device 4, for example, when there is no terminal device 4 capable of communicating with the relay device 3. In such a case, the controller 30 of the relay device 3 deletes the registered "update of the control program 41A" from the action DB, and notifies the management server 2 that the control program 41A cannot be updated.

In S120, the controller 40 of the terminal device 4 transmits a polling command to the relay device 3 in order to confirm whether there is an action to be executed by the terminal device 4. When the "update of the control program 41A" is registered in the action DB as an action for the terminal device 4, the controller 30 of the relay device 3 transmits, to the terminal device 4, a command instructing "update of the control program 41A". At this time, server information of the server 10 that provides the new control program is also transmitted to the terminal device 4.

The controller 40 of the terminal device 4 that receives the command transmits, to the relay device 3, a command instructing deletion of the instructed action from the action DB. The controller 30 of the relay device 3 that receives the command deletes the action from the action DB.

In S125, the controller 30 of the relay device 3 stores the version of the new control program grasped in S110 into the storage unit 31. Then, in S130, the controller 30 notifies the management server 2 that the update of the control program 41A in the terminal device 4 is started.

On the other hand, in S135, the controller 40 of the terminal device 4 downloads the new control program from the server 10 specified by the server information. Then, in S140, the controller 40 transmits, to the relay device 3, whether the new control program is successfully downloaded, and in S145, the controller 40 stores the downloaded new control program into the storage unit 41. Then, in S150, the controller 40 updates the control program 41A stored in the storage unit 41 using the downloaded new control program.

When the terminal device 4 does not download the new control program even after a time limit has elapsed after receiving the update instruction for the control program 41A, the controller 30 of the relay device 3 notifies the management server 2 that update of the control program 41A fails.

When the update of the control program 41A is completed, the terminal device 4 is restarted (S155), and the controller 40 transmits the status information to the relay device 3 due to the restart (S160). The startup flag of the status information that is initially transmitted after the restart is in the ON state. The status information transmitted after the restart includes the version of the new control program.

On the other hand, the controller 30 of the relay device 3 that receives the status information determines whether the startup flag included in the status information is in the ON state (S165). When the startup flag is in the ON state, the controller 30 grasps the version of the control program 41A included in the status information as the version of the control program 41A after update. When the version stored in S125 matches the newly grasped version, the controller 30 determines that the control program 41A is successfully updated, and determines that the update of the control program 41A fails when the versions do not match.

Then, in S170, the controller 30 of the relay device 3 transmits a determination result as to whether the control program 41A is successfully updated to the management server 2. In subsequent S175, the controller 30 transmits, to the management server 2, the latest status information for the terminal device 4 which is instructed to update the control program 41A.

The update instruction for the control program 41A transmitted from the management server 2 to the relay device 3 in S100 may be an instruction to collectively update the control programs 41A of the plurality of terminal devices 4. In such a case, the control programs 41A of the terminal devices 4 may be updated by executing the same processing as S115 to S175 corresponding to terminal devices 4 in which the control programs 41A are to be updated.

According to the configuration in the above, whether the control program is updated is determined based on the version of the control program after update acquired before the control program is updated and the version of the control program installed in the terminal device that is restarted. Accordingly, whether the control program is successfully updated can be grasped.

According to the configuration in the above, the version of the control program installed in the terminal device that is restarted can be suitably acquired.

In one aspect of the present disclosure, the first acquisition unit may be configured to acquire the version of the control program after update by acquiring the control program after update according to the update instruction and analyzing the acquired control program.

According to the configuration in the above, the version of the control program after update can be suitably acquired before the control program is updated in the terminal device.

In one aspect of the present disclosure is a relay device corresponding to a computer that operates according to the above relay program. According to the aspect in the above, whether the control program is successfully updated can be grasped.

6. Effects (1) According to the above embodiment, whether the control program is updated is determined based on the version of the new control program acquired before the update of the control program 41A in the terminal device 4 and the version of the control program 41A installed in the terminal device 4 that is restarted. Accordingly, whether the control program 41A is successfully updated can be grasped.

(2) The relay device 3 grasps the version of the control program 41A included in the status information in which the startup flag is in the ON state as the version of the control program 41A after update. Therefore, the version of the control program 41A installed in the terminal device 4 that is restarted can be suitably acquired.

(3) The relay device 3 downloads the new control program after update from the server 10 before the control program 41A is updated in the terminal device 4, and analyzes the new control program to check the version of the new control program. Therefore, the version of the new control program can be suitably acquired before the control program 41A is updated in the terminal device 4.

7. Other Embodiments (1) In the above embodiment, the relay device 3 and the terminal device 4 are configured to directly communicate with each other. However, the present invention is not limited thereto, and the relay device 3 and the terminal device 4 may communicate with each other via a mediation device. Specifically, in the above embodiment, as an example, the relay device 3 and the terminal device 4 communicate with each other by HTTPS, but for example, when the terminal device 4 does not support HTTPS, a mediation device which can communicate by HTTPS may be used. That is, the communication between the relay device 3 and the terminal device 4 may be relayed by the mediation device by performing communication between the terminal device 4 and the mediation device by HTTP and performing communication between the mediation device and the relay device 3 by HTTPS.

In this case, the control program 41A of the terminal device 4 is also updated in the same manner as the update processing described above. However, in S135 of the update processing, the terminal device 4 may download the new control program from the server 10 via the mediation device. That is, the mediation device may download the new control program from the server 10, and then provide the new control program to the terminal device 4. Of course, the present invention is not limited thereto, and the terminal device 4 may directly download the new control program from the server 10.

(2) When the terminal device 4 performs polling on the relay device 3, a command indicating an action is transmitted from the relay device 3 to the terminal device 4. However, the transmission method from the relay device 3 to the terminal device 4 is not limited thereto, and may be implemented in various methods.

(3) In the above embodiment, the startup flag and the version of the control program 41A are transmitted from the terminal device 4 to the relay device 3 as part of the status information of the terminal device 4. However, the present invention is not limited thereto, and the startup flag and the version of the control program 41A may be transmitted from the terminal device 4 to the relay device 3 separately from the status information. Specifically, for example, when communication between the terminal device 4 and the relay device 3 is performed by HTTPS, the startup flag and the version of the control program 41A may be relayed and transmitted to the relay device 3 using a query parameter.

A plurality of functions of one component in the above embodiment may be implemented by a plurality of components, or one function of one component may be implemented by a plurality of components. Further, a plurality of functions of a plurality of components may be implemented by one component, or one function implemented by a plurality of components may be implemented by one component. Further, a part of the configuration of the above embodiment may be omitted. Further, at least a part of the configuration of the above embodiment may be added to or replaced with a configuration of another embodiment described above.

(5) In addition to the relay device 3, the present disclosure may be implemented in various forms such as a non-transitory tangible recording medium such as a semiconductor memory or a hard disk drive in which the relay program

31B is stored, or a method corresponding to the update processing implemented by the relay program 31B.

8. Correlation of Wording

S100 of the update processing corresponds to an example of a reception unit, S105 and S110 correspond to an example of a first acquisition unit, S115 and S120 correspond to an example of an instruction unit, S160 corresponds to an example of a second acquisition unit, and S165 and S170 correspond to an example of a determination unit.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A non-transitory computer readable storage medium storing a relay program causing a computer to operate as a relay device configured to relay communication between a server and a terminal device, the relay program comprising:

a reception unit configured to receive, from the server, an update instruction instructing update of a control program for controlling the terminal device;

a first acquisition unit configured to acquire a version of the control program after update according to the update instruction;

an instruction unit configured to instruct update of the control program in the terminal device;

a second acquisition unit configured to acquire a version of the control program installed in the terminal device that is restarted; and a determination unit configured to:

determine whether the control program in the terminal device is successfully updated by comparing the version of the control program acquired by the first acquisition unit with the version of the control program acquired by the second acquisition unit, and output a determination result to an outside, the determination result indicating whether the control program in the terminal device is successfully updated, wherein the terminal device is configured to transmit, to the relay device, status information in which a startup flag is set to ON only after the terminal device has updated the control program and restarted, and wherein when the relay device receives the status information in which the startup flag is ON, the determination unit confirms that the terminal device has restarted after the control program update, and the determination unit determines the version of the control program in the terminal device after the control program update.

2. The storage medium according to claim 1, wherein the terminal device is configured to provide, to the relay device, status information indicating a state of the terminal device, the status information includes at least information indicating an initial notification after startup of the terminal device and information indicating the version of the control program installed in the terminal device, and the second acquisition unit is configured to acquire the version of the control program from the acquired status information when the status information including the information indicating the initial notification after startup of the terminal device is acquired after the instruction unit instructs the terminal device to update the control program.

3. The storage medium according to claim 1, wherein the first acquisition unit is configured to acquire the version of the control program after update by acquiring the control program after update according to the update instruction and analyzing the acquired control program.

4. A relay device configured to relay communication between a server and a terminal device, comprising:

a controller, comprising a processor, configured to:

receive, from the server, an update instruction instructing update of a control program for controlling the terminal device;

acquire a version of the control program after update according to the update instruction;

instruct update of the control program in the terminal device;

acquire, from the terminal device, a version of the control program installed in the terminal device that is restarted;

determine whether the control program in the terminal device is successfully updated by comparing the version of the control program acquired after the update according to the update instruction with the version of the control program acquired from the terminal device, and output a determination result to an outside, the determination result indicating whether the control program in the terminal device is successfully updated, wherein the terminal device is configured to transmit, to the controller, status information in which a startup flag is set to ON only after the terminal device has updated the control program and restarted, and wherein when the controller receives the status information in which the startup flag is ON, the controller confirms that the terminal device has restarted after the control program update, and the controller determines the version of the control program in the terminal device after the control program update.

* * * * *